Oct. 1, 1929.                 B. C. STICKNEY                 1,730,174
                        INTERNAL COMBUSTION ENGINE
                           Filed May 20, 1926          8 Sheets-Sheet 6
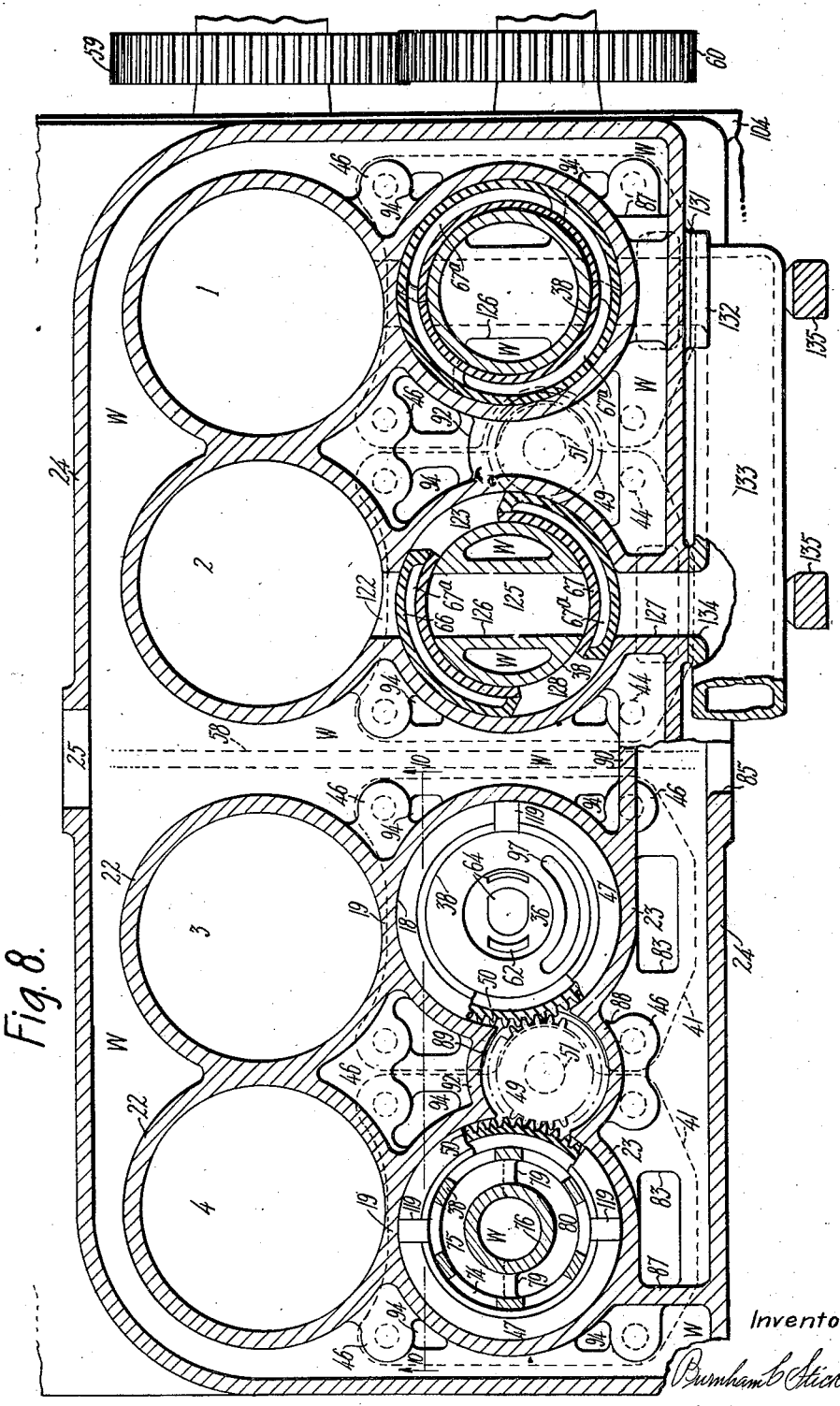
Inventor:
Burnham C. Stickney Oct. 1, 1929.  B. C. STICKNEY  1,730,174
INTERNAL COMBUSTION ENGINE
Filed May 20, 1926  8 Sheets-Sheet 7

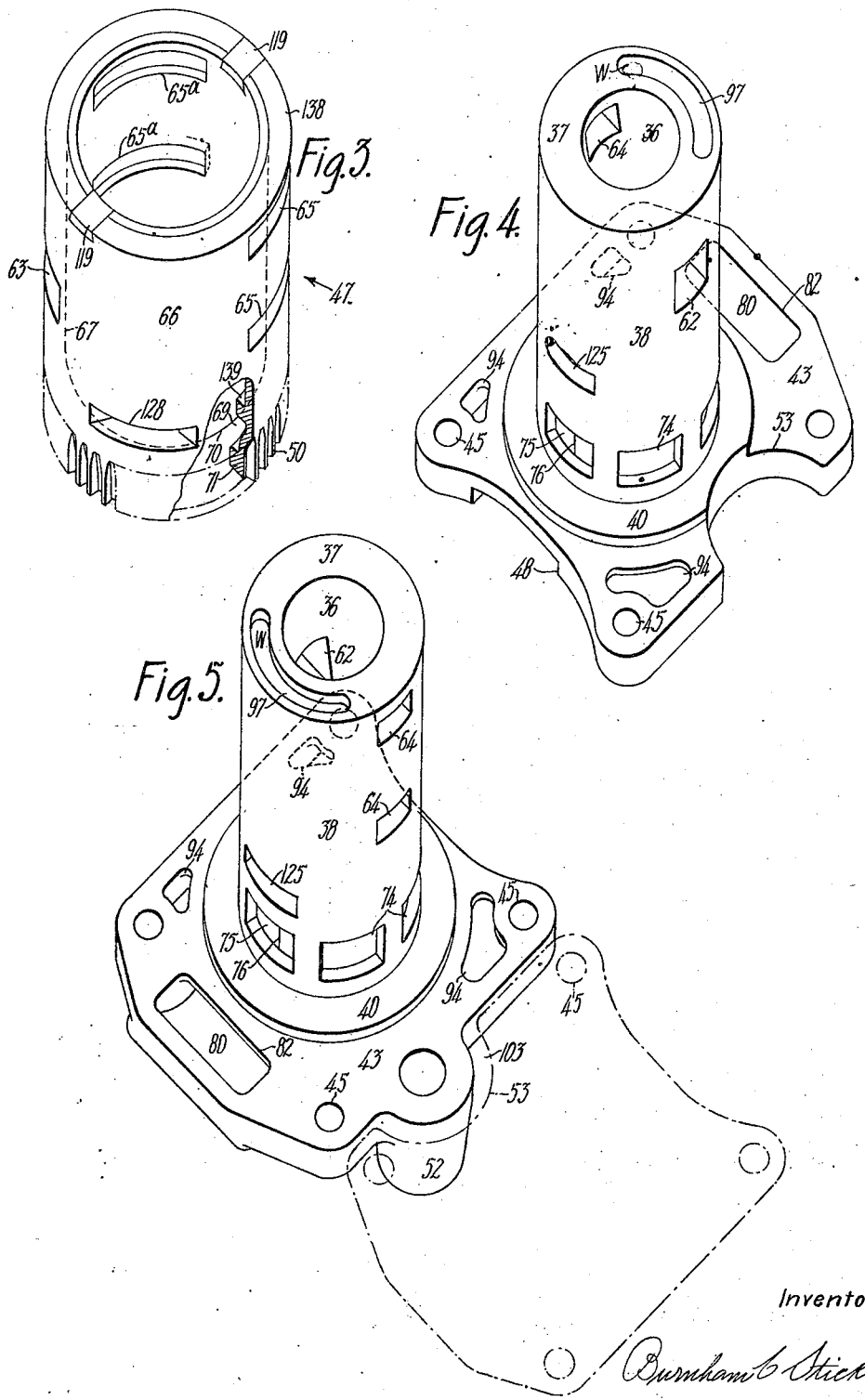

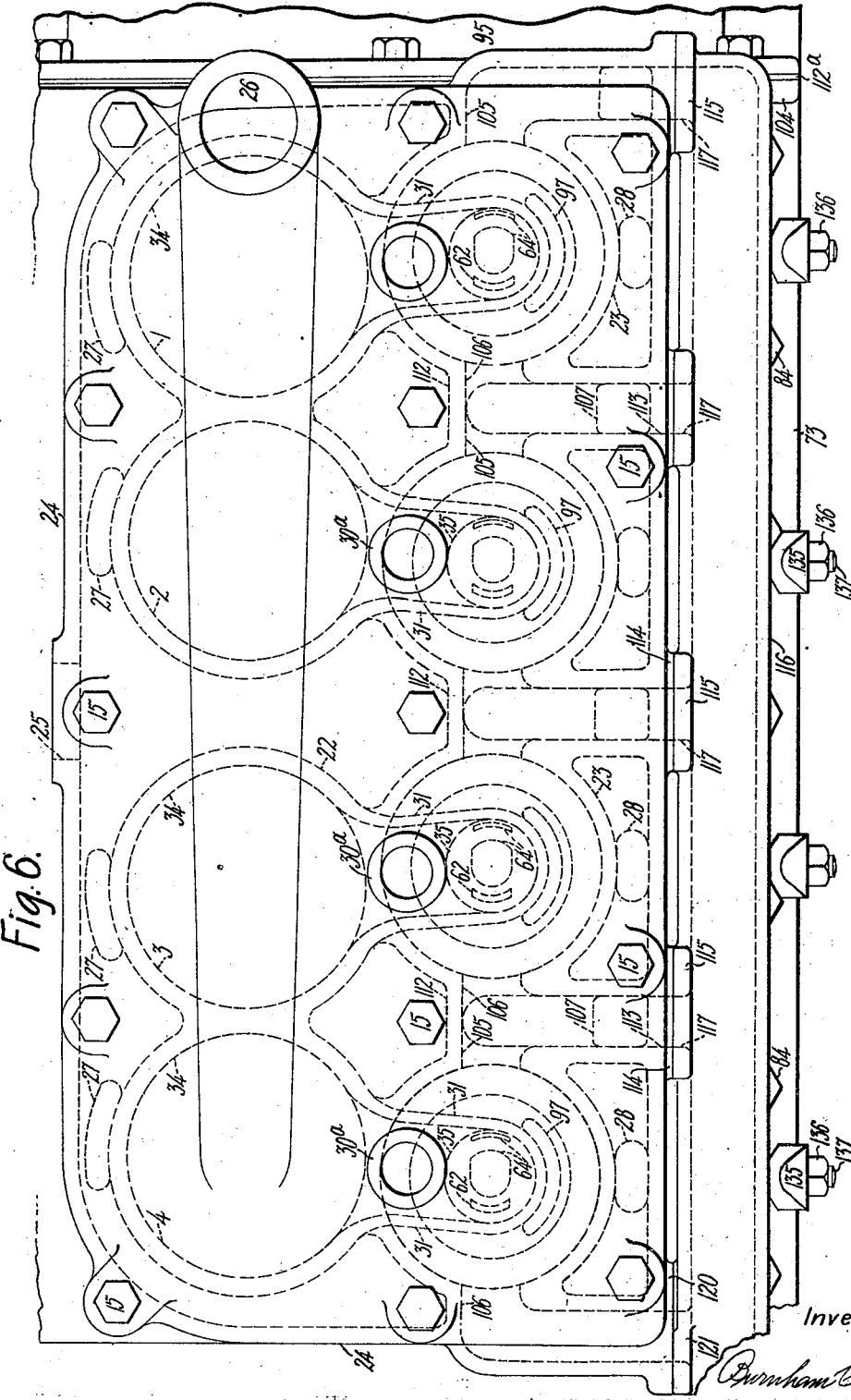

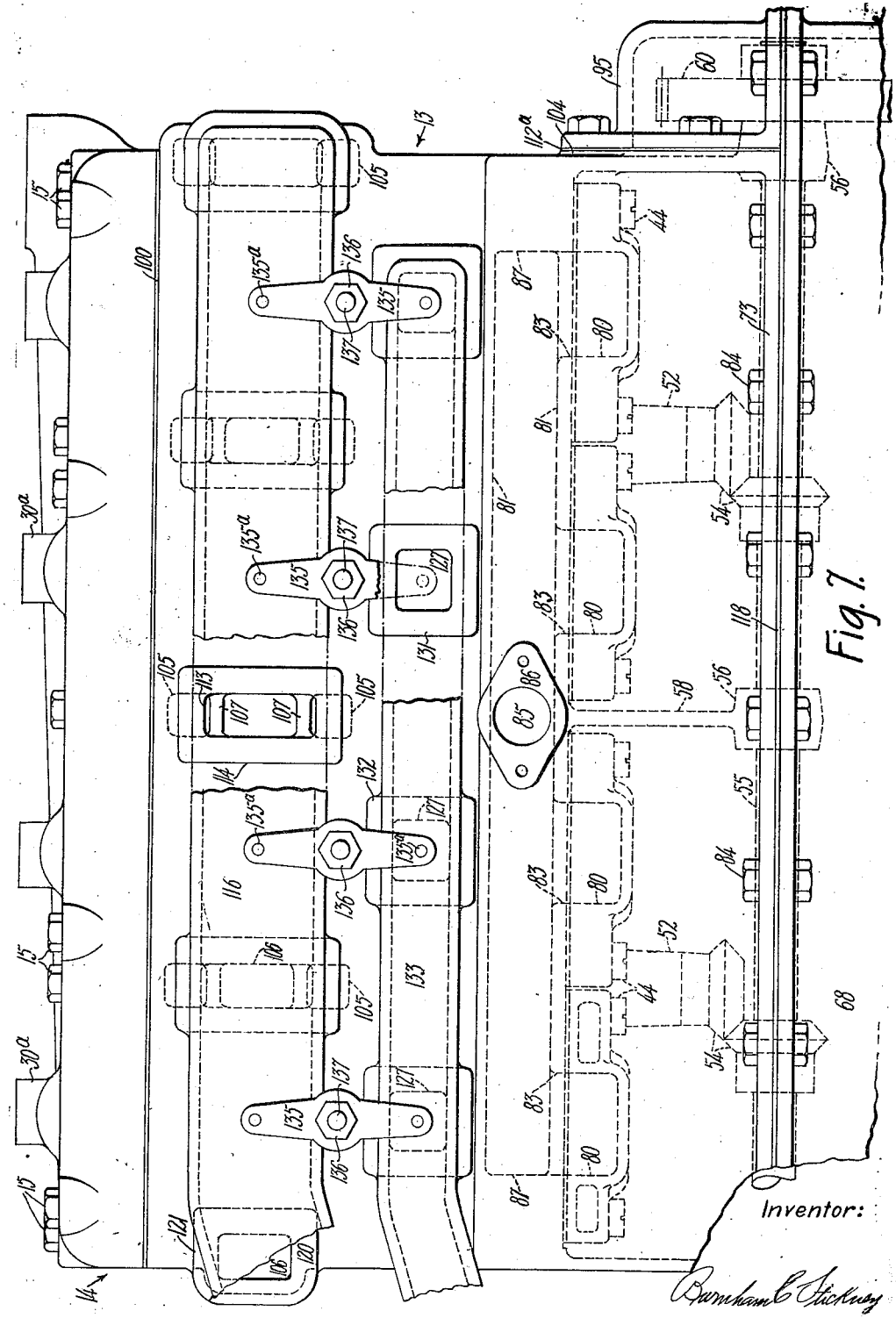

Inventor:
Burnham C. Stickney

Oct. 1, 1929.  B. C. STICKNEY  1,730,174
INTERNAL COMBUSTION ENGINE
Filed May 20, 1926  8 Sheets-Sheet 8

Inventor:
Dunham C Stickney

Patented Oct. 1, 1929

1,730,174

UNITED STATES PATENT OFFICE

BURNHAM C. STICKNEY, OF PORTSMOUTH, NEW HAMPSHIRE

INTERNAL-COMBUSTION ENGINE

Application filed May 20, 1926. Serial No. 110,340.

This invention relates to rotary valves for internal combustion and other engines.

The valve is a cylindrical hollow-walled revolving ported shell or barrel, having exhaust orifices at opposite sides, each orifice extending entirely through the double wall of the shell. The valve at one portion thereof, which is not in the same zone as the exhaust ports, has an opening which admits mixed air and fuel into the annular space between the double walls of the valve. The porting may also include inlet ports in the interior one of the two valve walls for admitting the charge to the engine cylinder. The charge circulates between the inner and outer walls of the valve and becomes heated, incidentally cooling the valve, the charge being taken into said annular space in one zone and discharged into the engine in another zone. The valve inlet ports, through which the charge passes into the engine, may be in the same zone as the exhaust ports but spaced therefrom circumferentially of the valve, thereby utilizing the same valve seat ports for both intake and exhaust.

The valve is revolved once for two revolutions of the engine crank-shaft. The pressure of gas is balanced upon the revolving valve. The exhaust ports are open only once in each revolution, the same being also true of the inlet ports. For pressure-balancing purposes the ports in the valve seat (which is in the nature of a stationary cylinder over which the valve telescopes or forms a sleeve) are placed upon opposite sides of the cylinder; yet the exhaust and inlet ports are opened only once in each revolution. To this end, the exhaust ports show a certain difference at opposite sides of the valve seat. One side of the valve seat has a full-sized port, while the other side thereof has two half-sized ports, and the latter are placed in different zones, as compared with said full-sized port. The half-sized or fractional ports are placed one above and one below the zone of the full-sized port. With this arrangement corresponds the porting of the rotary valve, the same having at one side a full-sized exhaust port, and on the other side upper and lower half-sized exhaust ports. It results that at one point in the revolution of the valve, its exhaust ports all register with the respective ports of the internal valve seat, so that gases may be discharged from the engine. When, however, the valve makes a half revolution from said point, none of its exhaust ports comes into register with the ports in the valve seat, which therefore remain closed or out of use. In this manner of keying the ports, registration and co-operation between the ports of the valves and valve seats occur only once in every revolution of the valves. Hence the exhaust ports are opened or used once in every two revolutions of the engine crank-shaft. This secures quick opening and closing of the ports and secures balancing of gas-pressure on the valve.

The inlet ports in the inner of the two walls of the hollow valve are also diametrically opposed, and comprise a large inlet port on one side and upper and lower half-sized inlet ports on the other side to co-operate with the seat ports. These inlet ports follow the exhaust ports as said valve rotates and the charge flows in through the same seat ports that are used for the exhaust. With a full-sized intake port on one side and two separated half-sized intake ports on the other side, intake communication with the engine cylinder is established only once in each revolution of the valve. Thus there is accomplished the double purpose of securing balanced gas-pressure and causing the inlet valve ports alternately to register and disaccord with the seat ports, preferably once in each revolution of the valve or in two revolutions of the crank-shaft. A single individual hollow-walled valve constitutes the sole rotating part of the valve elements for each cylinder, and may be suitably driven by means of a simple train of gearing from the engine crank-shaft.

Each valve seat is located within its valve, and is in the form of a hollow-walled support, preferably cylindrical to match the shape of the valve, which is also preferably cylindrical. Water circulates within the valve seat for shielding the valve from the heat of explosion, and also for the purpose of minimizing the temperature of the valve and equalizing the temperature of seat and valve. The valve seats are made in separate units and secured to a valve block; and each valve seat before its attachment may be inexpensively ground to exact fit for the interior periphery of the valve, and may then be inserted in the valve block and fastened. The valve seat is a hollow-walled cylinder closed at one end except for a central opening or chamber in said end for gas passage to and from the engine; with ports radiating from said opening or chamber to the exterior of the valve seat to correspond as aforesaid with the valve ports.

The row of valve chests may be cast in one piece with the valve block, and the latter may be water-jacketed throughout, minimizing and equalizing the heat of the chest and valves. Cool water is supplied directly to the hollow interiors of the several valve seats. Provision is made for water-communication between each attached valve seat and the main water compartment of the engine block, and provision is also made for guarding against leakage of water into the engine cylinders.

The valve may be formed of separate inner and outer shells properly secured together, without departing from the spirit of the invention.

The valve may be a one-piece casting including both inner and outer walls, but it is preferably made in two separate portions, one portion being an outer casting, and the other portion being a cylindrical tube, these portions being properly secured together. The preferred construction tends to economy in manufacturing, and presents other advantages as will hereinafter appear.

The gear connection may include a countershaft geared directly to the crank-shaft to revolve at the same speed, and vertical shafts geared to said counter-shaft to revolve at the same speed and carrying pinions to mesh with gears formed directly upon the valves, the pitch diameters of said pinions and the gears formed upon the valves being such that the valves revolve once for each two revolutions of the crank-shaft. Each pinion may be placed between two adjoining valves, so that two valves are revolved by the same pinion.

The valve chests are cast in one piece with the engine block, and the revolving valve barrels are adjacent to and preferably parallel to their respective engine cylinders. In the illustrated form of the invention the cylindrical seats and the cylindrical chests for the valves stand vertically and parallel with the axes of the engine cylinders. The invention is shown embodied in a four cylinder engine and each of the four valve seats has a water-inlet at its lower end, which may be in communication with the water-jacketing of the engine block, and has also a water-outlet at its upper end into a detachable engine head. The water then circulates from the engine jacket through the valve seats and finally out into the detachable engine head which covers the entire engine block including the valve chests. The valves stand side by side with the engine cylinders, the tops of the valves being about as high as the tops of the cylinders, and the same cooling water circulates through both the engine jacket and the valve jackets, both exterior and interior, without exposing the valves to liability of damage from failure of water, inasmuch as there must be water present in the valve block to as high a level as in the engine block, and the pistons, which are subjected to great stresses, being more liable to seize than the valves, which have only to rotate idly. The space between the walls of the seat, utilized for an internal water-jacket for the valve, extends the whole length thereof and is a material element in keeping the valve cool.

The exterior water-jacket of the valve block forms a continuation of the water-jacket of the engine block and aids in keeping the valve cool. From this exterior water-jacket the water may circulate under the bottom of each valve seat and up through a passage in said seat and circulate up between the inner and outer walls of said seat and rise to the top thereof and flow out into the water-jacket, which forms part of the general detachable head, from which it escapes to the usual radiator. This arrangement provides an ample inlet for cool water at the bottom of the valve seat and an ample outlet for heated water at the top thereof.

Thus the valve is cooled not only by water in the block jacket circulating around the valve chest, but also by water which circulates from said jacket through the hollow interior of the valve seat. Openings for the supply of water to the hollow interiors of the valve seats are so arranged that the water is admitted from the bottom of the block, where the water is coolest. The water throughout the engine and valve seats may be circulated by convection or otherwise.

Another feature of the present invention is that each of the valve seats may be formed as a separate unit in the form of a butt-ended cylinder. The butt is at the base of the cylinder, and forms a hollow portion of much greater diameter than the valve seat, and constitutes a flange or shoulder which is fastened up against the bottom of the valve block, with said seat extending up through a perforation in said bottom and standing inside of a chest in the block. An annular space is left between the seat and the chest to form a race in which the barrel valve revolves. This conduces to saving of expense and increase of accuracy in boring and finishing the valve chest, because the bore of the chest is open for machining at both top and bottom of the block. Furthermore the exterior of each detachable valve seat may be finished cheaply and accurately, because of its accessibility, and the enlarged base or butt portion of each seat is utilized both as a basin to receive the cooling water and as a passage for fuel from the intake manifold to suitable apertures in the valve seats, from which the fuel feeds into the space between the walls of the hollow valve.

Each seat with its base is separately and detachably fastened up against the finished base of the valve block, the joint being kept tight by means of a gasket, of which there needs to be only one for each valve seat; the openings for both water and gas being placed all in the top of the protruding base-portion or annular enlargement or butt of said seat.

To secure economy of room and other advantages, the above-mentioned divided porting is arranged all at the top portion of the valve in an inverted explosion chamber formed by the aforesaid opening or chamber in the end of the valve seat. The diameter of said chamber may be relatively little, and a small-diameter gooseneck passage may connect said explosion chamber and the corresponding cylinder, so that the desired degree of compression of fuel may be secured. The gas in passing to the engine cylinder from the seat flows upwardly from said chamber and then transversely across the top of the valve, and then downwardly into the cylinder.

To provide for compactness of arrangement in the valve block and gain other advantages, the pressure-balanced porting in the valve seats opens into exhaust outlet passages, each of which may take the form of horizontal elbow passages discharging at the side of the valve block into a detachable exhaust manifold, the bends of the elbows being disposed between adjoining valve chests, and one elbow being placed above another, and being mainly out of communication therewith, to minimize or avoid back pressure of the escaping gas upon other valves.

Another feature is in the nature of a simple means for providing for piston-controlled exhaust from each engine cylinder, beginning at a point when the piston has nearly completed its explosion stroke; these exhaust devices being separate from and additional or auxiliary to the exhaust porting of the rotary valves, and each auxiliary device having an opening out of the bottom of the engine cylinder, each opening being covered by the piston until the crank-shaft of the engine has turned through say 130 or more degrees. The opening of this engine port continues during the remaining 50 degrees or so of the stroke of the piston, and also until the piston has made corresponding progress at the early stage of the return or exhaust stroke.

This piston-controlled exhaust port in the engine cylinder opens into a port in the valve, through which exhaust gas vents. The vented gas escapes through a passage that is provided in the valve seat. In one form of the invention, this vent passage may extend transversely of the valve seat, and the exhaust may pass thence through a port that is provided in the opposite side of the barrel valve, and thence into an exhaust port that is formed in the valve block, through which it escapes into a manifold. Said manifold is preferably separate from the previously-mentioned exhaust manifold, so as to prevent back-pressure upon the top of any piston from the gas escaping through this auxiliary vent device. The ports in one side in the valve and valve block are arranged in different zones, or the ports on one side above those on the opposite side (the transverse passage through the seat having a corresponding inclination), so that said ports open only once in each revolution of the valve. These opposite auxiliary exhaust ports are all closed at about the end of the succeeding half revolution of the valve. Said transverse passage is water-jacketed, or in the form of a conduit extending through the water chamber of the valve seat, preventing said seat from becoming unduly heated.

By means of this device the pressure upon the piston may be materially reduced before the engine has to return the piston through the speedy portion of its exhaust stroke, so that waste of power from back-pressure on the piston is minimized, and exposure of the rotary valve and also of the engine piston to high heat and great pressure of exhaust gas is avoided, tending to preserve the coolness and minimize the wear of the piston and the valve, and also by division or dispersion tending to reduce the concussion or noise made by the exhaust of the engine, the auxiliary vent opening in advance of or having a substantial lead over the rotary valve exhaust port, and the latter being closed long after the closing of the vent in the bottom of the engine cylinder.

Another feature of the invention is that the supply opening through which fuel is admitted into the hollow-walled valve barrel, is formed in the same cylindrical inner surface of the valve with the valve ports which control the flow of fuel from the hollow valve walls into the engine cylinder. By forming all these openings and ports in a single cylindrical surface of the valve, the advantage is gained that only the joint between said single valve surface and the valve seat itself needs to be made with such attention to close fitting as to prevent leakage of fuel. Moreover, the diameter of this inner cylindrical bearing surface is not so great as to entail trouble of either leakage or binding ing due to unequal expansion of the water-cooled internal seat and said valve.

The fit between the outer cylindrical surface of the valve in the associated valve chest bore may be made with ordinary manufacturing tolerances, as a slight leakage of the exhaust gas would have no practical consequence. Furthermore, the valve may be sealed by the lubricating oil, and a comparative looseness of the fit between said outer cylindrical valve surface and the bore in the chest tends to insure that the valve will rotate freely within said bore under all degrees of temperature.

Other features and advantages will hereinafter appear.

In the accompanying drawings,

Figure 1 is a transverse section of the engine through one of the cylinders and corresponding valve elements.

Figure 2 is a longitudinal section of the engine through the centers of the rotary valve chests. In this view a section through the valve elements for cylinder 4 is shown and indicated by the line 2—2 of Figure 1. The valve elements for cylinders 1 and 3 are shown partly sectioned. The valve for cylinder 2 is not sectioned in this view. Parts of this view are sections indicated by the line 2ª—2ª of Figure 1.

Figure 3 is a perspective view of the rotary valve with a portion of the lower end thereof broken away to show some details of its construction.

Figure 4 is a perspective view of one of a pair of valve seats as seen from the left side of Figure 1.

Figure 5 is a perspective view of the other one of said pair of valve seats as seen from the side of the engine opposite the side from which Figure 4 is taken. In said Figure 5 the relative position of the valve seat of Figure 4 is indicated by a dotted outline.

Figures 6 and 7 are, respectively, a top plan view and a side elevational view of the engine, said Figure 7 showing the engine as viewed from its exhaust side.

Figure 2:
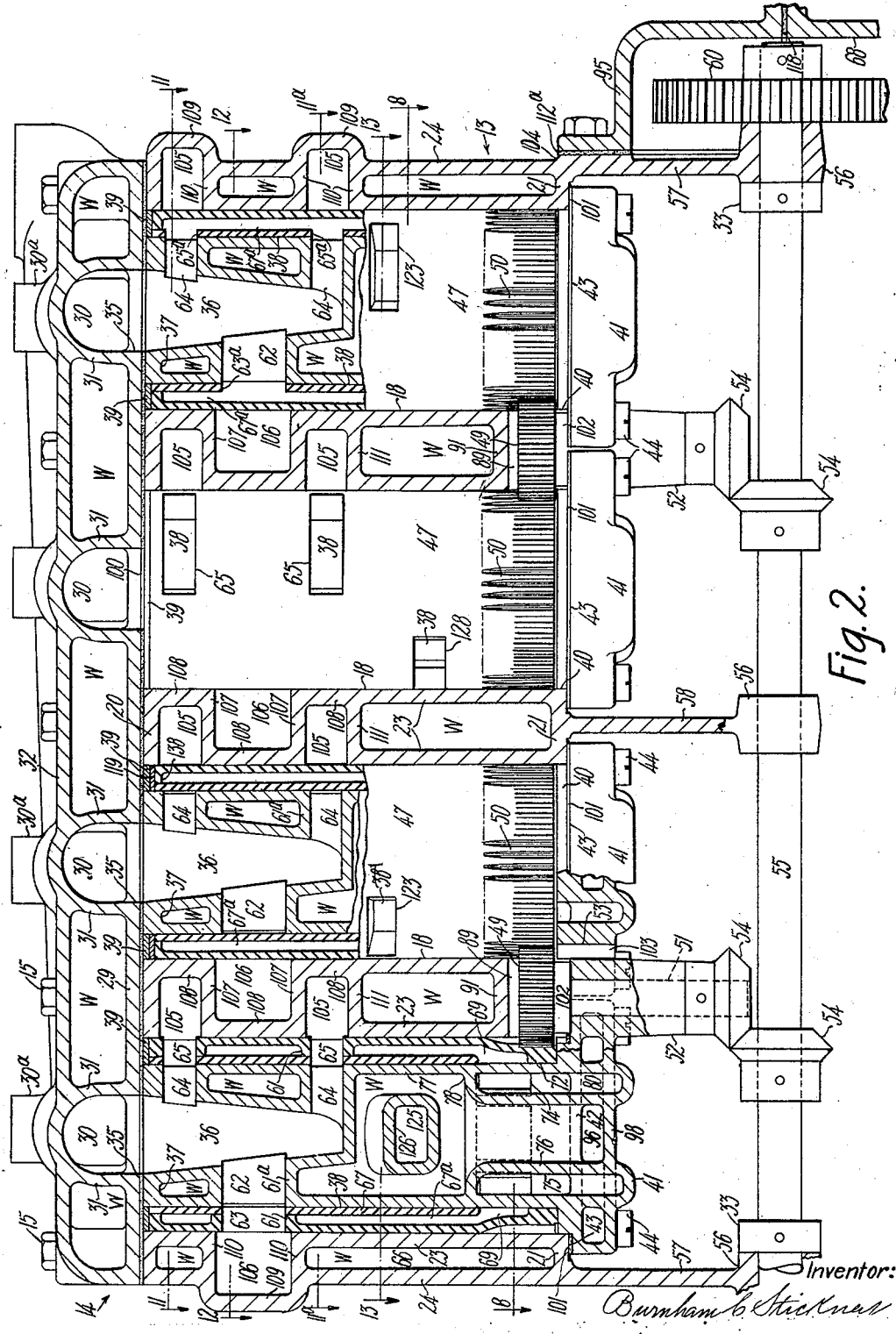

Figure 8 is a sectional top plan view of the engine, showing a section substantially through the line 8—8 of Figure 2. The rotary valves corresponding to cylinders 3 and 4 are shown partly sectioned to illustrate the driving means. The valve seat of cylinder 3 is shown in full. The valve seat of cylinder 4 is shown as a section on said line 8—8 of Figure 2. The valve seats and valves of cylinders 2 and 1 are shown as sections, respectively, through and just above their auxiliary exhaust passages.

Figure 9:
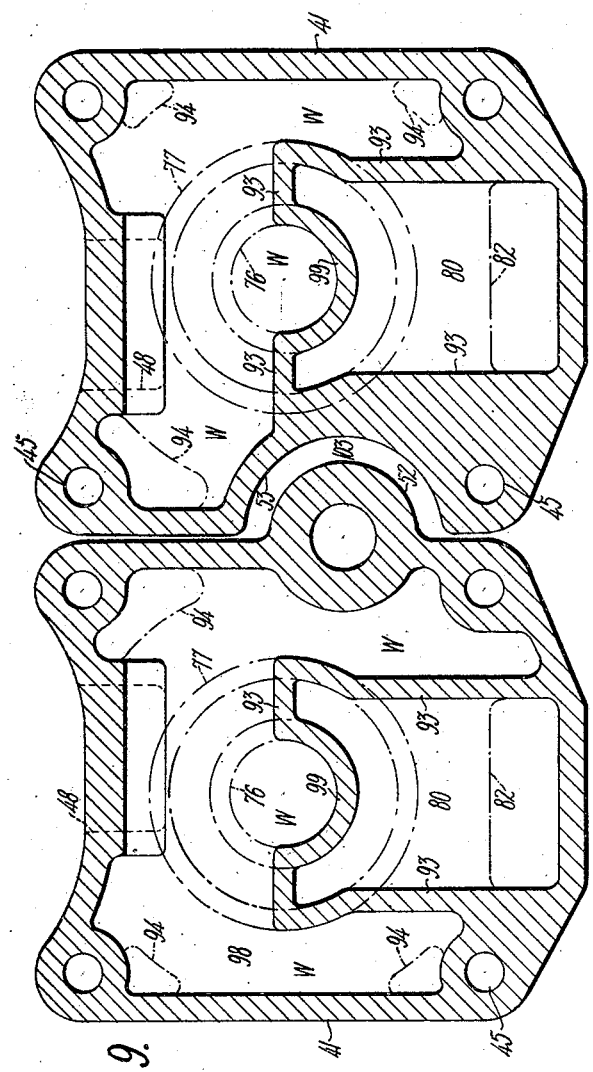

Figure 9 is a sectional plan view of the basins which form the bottom portion of a pair of valve seats, and shows the fuel passages partitioned from water-spaces in said basins.

Figure 10:
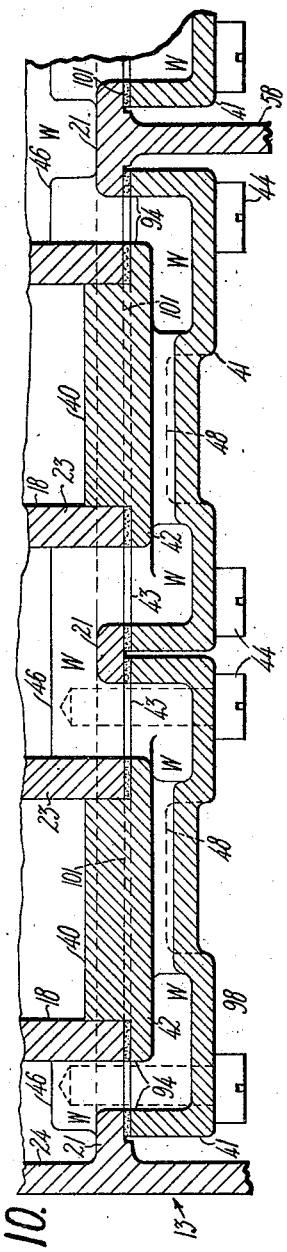

Figure 10 is a fragmentary elevational view of a section through the line 10—10 of Figure 8, showing two of the openings for the passage of water from the engine block to the basins which form the lower portions of the valve seats.

Figure 11:
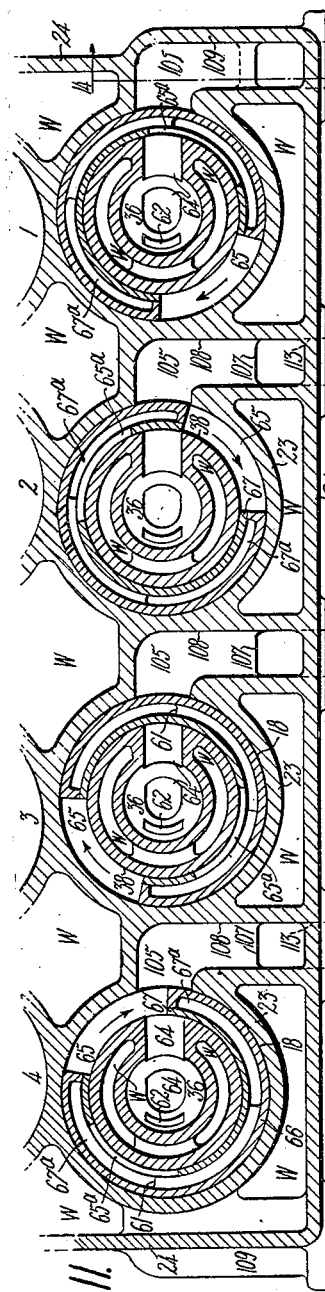
Figure 12:
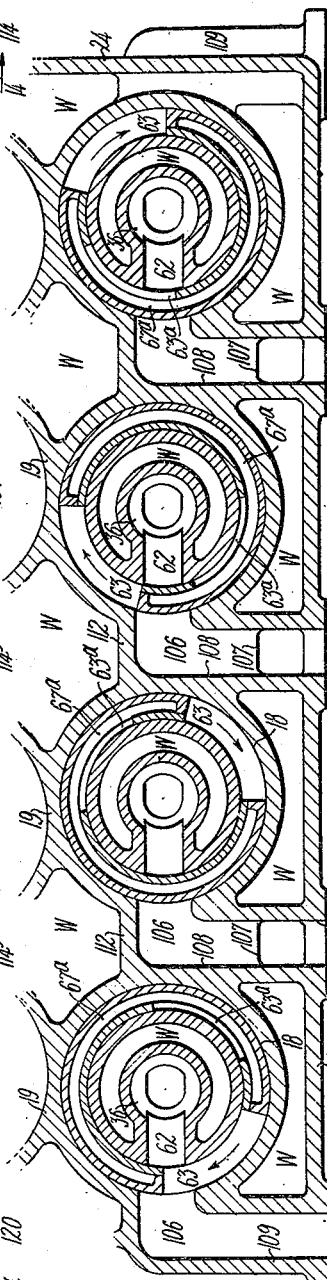
Figure 13:
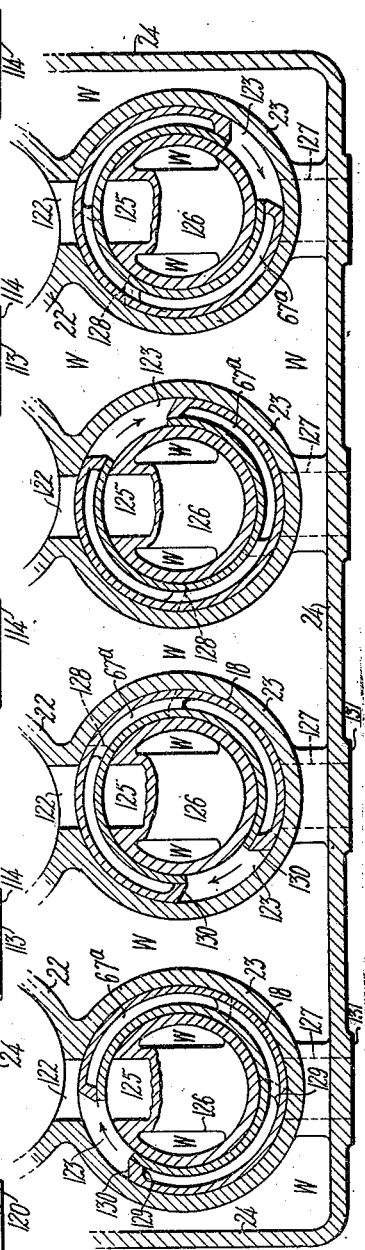

Figures 11, 12 and 13 are plan views of sections through the lines 11—11, 12—12 and 13—13, respectively, of Figure 2, showing the relative positions of the revolving ports of the valves with respect to their corresponding passages and outlets at the moment when the piston in cylinder 4 is at the end of its explosion stroke. The section on which Figure 13 is taken is also indicated by the line 13—13 of Figure 1.

Figure 14:
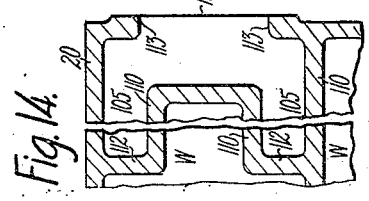

Figure 14 is a fragmentary sectional elevation indicated by the line 14—14 of Figure 11, and shows some details of construction of the engine block around the outer exhaust outlets for cylinder 1.

Figure 1:
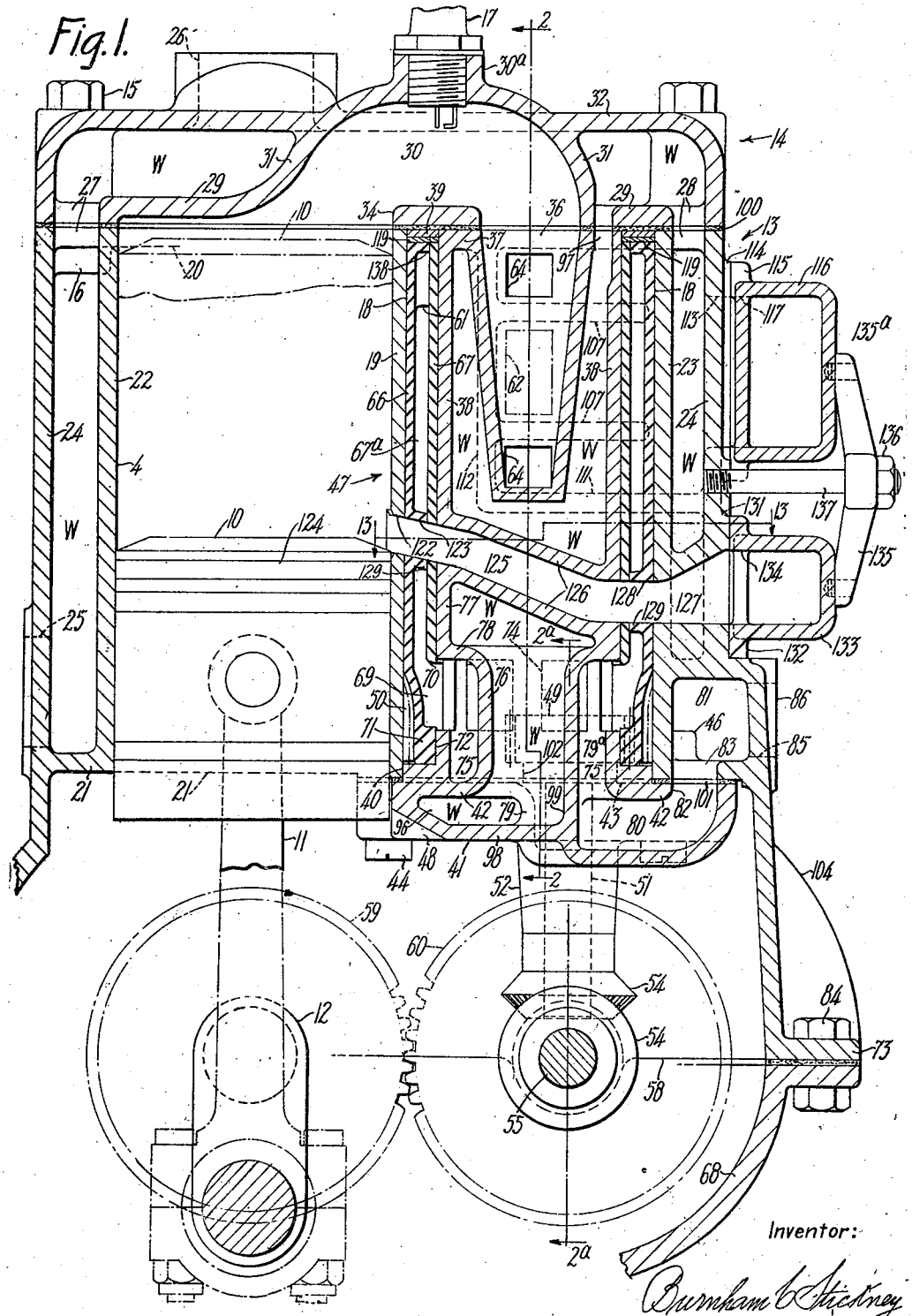

The invention is embodied illustratively in an internal combustion engine having say four cylinder bores 1, 2, 3 and 4, in each of which a piston 10, Figure 1, by means of a connecting rod 11 drives the usual crankshaft 12. Said cylinders are bored in an engine block 13, upon which is fastened a head 14 by means of bolts 15 threaded into bosses 16.

As will appear from the following detailed description, the usual mixture of fuel enters a manifold 81 in the lower right-hand side of the engine block, Figure 1, and is supplied thereby through bottom openings 83 to U-shaped subjacent channels 80, of which there is one for each valve. The fuel rises thence into an annular conduit 75, having peripheral openings through which the charge flows into a mouth 69 into an annular gas chamber 67ª formed in a rotary valve. The latter is ported at its upper portion to admit the charge through ports 62 and 64 into an inverted explosion chamber 36, which forms part of a cylindrical seat 38 around which the valve revolves. The valve has at its lower end drive teeth 50. A gooseneck passage 30 connects explosion chamber 36 to the associated engine cylinder. A spark plug 17 extends into each gooseneck. The ports 62 and 64 in the explosion chambers, also used for exhaust, lead through compactly placed lateral passages to a main exhaust manifold 116. An auxiliary exhaust port 122 is opened by the piston in the latter part of its explosion stroke, and some of the exploded charge is led through a valve port 123 and a transverse passage 125 in the valve seat to a lower opposite valve port 128, opening into an auxiliary exhaust manifold 133. Each valve seat 38 at its lower end is butt-ended or formed with a base-box, which is fastened up against the bottom of the combined engine and valve block, said box containing the U-shaped inlet channel 80 and also containing a water-basin, which opens up into the water-jacketing of the combined engine and valve block. The heated water rises into the head directly from the engine and valve block, and also passes up from the basins through said seats and out of the tops of said seats into the engine head, forming an interior cooling device for the valves.

The pressure due to compression and explosion is balanced upon opposite equal portions of the revolving valve, the latter closing and sealing its ports during the usual intervals of compression and explosion. There is formed a row of cylindrical valve chests 18, one for each cylinder, in the combined engine and valve block 13, which may form a single casting with the chests; each valve bore or chest being alongside of and parallel with and joined to its corresponding engine cylinder or bore, from which it is separated by an integral partition 19. This partition at its top joins a top plate 20, and at its lower end joins bottom plate 21 of the engine block 13. Said partition 19 is a merging of engine cylinders 22 and cylindrical valve chests 23, which also extend between and join the top and bottom plates 20 and 21 of the combined engine and valve block. The valve chest bores extend from the top of plate 20 to the bottom of plate 21, and each valve chest bore is open at both ends, whereby the machining thereof may be done with facility.

The cylinders 22 and chests 23 are surrounded by ample water-spaces, which separate them from the side walls 24 of the block. Ample water-spaces are also formed in the detachable head 14, and all are generally indicated in the drawings by the letter W. The cooled water from the radiator enters the block 13 through 25 in the lower wall thereof, and is discharged through an opening 26 in the head 14. Suitable passages between the water-spaces of the engine block 13 and the head 14 are afforded by openings 27 and 28 in both the top 20 of the engine block, and the bottom 29 of head 14.

The water-jacket of the head surrounds conduits 30, one for each cylinder, forming part of the explosion or combustion chamber. An ignition plug 17 for each cylinder is inserted through an opening at 30ª in said conduit. The conduits 30 have walls 31 which extend between and are joined integrally to the bottom 29 and top 32 of said head. Each conduit forms a gooseneck transverse passage (see Figure 1) and each serves to connect a pair of openings 34 and 35 in the bottom 29 of the head 14, see Figure 6. The larger opening coincides with a cylinder bore, and the smaller opening coincides with the top of explosion chamber 36 within the valve.

Said chamber 36 is a deep depression formed in a top wall 37 of the upstanding detachable hollow cylindrical central valve seat 38. Said seat extends substantially from end to end of the valve chest bore, and is set exactly concentric therewith by means of a ring 39, which closely fits within the valve chest bore and around the upper circumference of the cylindrical valve seat. Exact concentricity of the lower end of said valve seat with the valve chest bore is secured by means of a circular shoulder 40 formed at said lower end, the circumference of said shoulder closely fitting the lower end of the valve chest bore.

Each cylindrical valve seat includes a butt portion which extends below the valve chest, and this butt portion or expanded base is in the form of a box 41 having a top 42, the upper face 43 of which is machined to a plane surface. From said top surface 43 the cylindrical valve seat rises perpendicularly, forming a unit that is attached to a suitably finished portion of the underside of the bottom 21 of the engine block 13, by means of screws 44 passing through holes 45, one in each corner of the box or butt 41. Said screws are threaded into (not through) bosses 46 raised upon the inner surface of the lower wall 21 of the engine block 13, Figure 8.

Within the annular race formed by the cylindrical valve seat and the valve chest is a barrel valve 47, which rotates upon the cylindrical valve seat 38, the outer circumference of which closely fits the inner circumference surface of the valve, said surfaces being ground to fit and forming when suitably lubricated a practically leak-proof joint.

The lower end of the valve 47 bears upon the upper surface of the shoulder 40; and the valve fills said race.

The valves are connected in pairs for rotation, each pair being rotated by a common pinion 49, the teeth of which mesh with gears 50 formed upon the lower ends of the valves. Each pinion is secured to the top of a vertical shaft 51, having a bearing in a lug 52 formed upon one of the valve seat boxes 41. The side of the adjacent box is formed with a cutaway to clear said lug 52, as shown at 53, see Figures 4, 5 and 9.

Each shaft 51, by means of gears 54, is driven by a counter-shaft 55 that is supported by three bearings 56, one in each end wall 57 of the crank-case portion of the engine block, and one in the center wall 58 of said crank-case portion, see Figure 2. Collars 33 secure the shaft 55 against play.

The counter-shaft 55 is driven from crank-shaft 12, by means of two gears 59 and 60 of equal pitch diameters, and the miter gears 54 are equal to one another, the shafts 51 having the same speed of rotation as the crank-shaft. The rotary valve makes one revolution for every two revolutions of the crank-shaft, and the corresponding reduction is effected by a one-half to one ratio of the pinion 49 to the gear 50 at the lower end of valve 47.

Each explosion chamber 36 has ports through which a charge is admitted into and expelled from the engine cylinder, and said ports are disposed at opposite sides of said chamber, to balance the gas-pressure on the valves, as already explained. In order that the rotary valve ports, whether they be intake or exhaust, shall register with said chamber or valve seat ports only once in each revolution of the valve, said ports are staggered upon opposite sides of the valve and seat, Figure 2; this being done without incurring the objection of an unbalanced couple, there being full area ports 62, 63 or 63ª on one side, located in a zone midway between two half area ports 64 (and ports 65 or 65ª) at the opposite side of the device.

The valve 47 is a barrel or cylindrical shell having an outer wall 66 spaced from an inner wall 67. Said walls form between them the annular space 67ª through which a fuel charge is drawn by the piston 10 through suitable ports 63ª and 65ª in the inner valve wall 67 registering at each revolution with seat ports 62 and 64 during the intake stroke (see valve of cylinder 1 in Figure 2).

The lower part of the annular chamber 67ª in the valve has the form of a mouth or circumferential in-feed opening 69, bounded by the lower end 70 of the inner valve wall 67, and the base portion 71 of the outer valve wall 66, said base portion having the exterior gear teeth 50 formed therein, and being seated upon a step 72 of the cylindrical valve seat.

Charges enter said mouth 69 through circumferentially spaced apertures 74 near the lower end of the hollow cylindrical valve seat 38. These apertures 74 open out from the annular gas passage or space 75 surrounding a water leg 76 in the bottom part of the valve seat 38. Said water leg at its upper end flares abruptly outward and merges into the outer wall 77 of the valve seat at 78. The bottom of annular gas passage 75 is the top 42 of basin 41. As will be seen at Figures 1 and 8, communication is established between the intake manifold 81 and said annular passage 75 by means of a channel 80 subjacent the lower edge of each valve. Said channel 80 at its outer end communicates with manifold 81 through top opening 82, which joins the opening 83 extending through the bottom 21 of the engine block. At the other end said subjacent channel 80 curves up at 79 and terminates in an uptake 79ª which merges into the annular gas passage 75. Said manifold 81, Figures 1 and 7, is cast integral with the engine and valve block, and has a midway inlet 85 around which is formed a finished pad 86, to which the usual carburettor or fuel supply may be secured.

The intake manifold has ends 87, Figure 8, which partition it from the adjacent water-spaces W of the valve head. The inner vertical wall of the intake manifold passage, as shown in Figure 8, includes portions of valve chests 23, sides 88 of housings 89 containing pinions 49, and also includes a middle partition 90 which separates it from an adjacent water-space. Said housings 89 for the pinions 49 have tops 91, Figure 2, and walls 92, Figure 8, forming portions of the water-jacketing of the valve block, with which said housings are integral, as well as the intake passage 81.

As seen in Figure 9, the sides of the channel 80 in each box or butt 41 consist of integral partitions 93, which divide said channel 80 from adjacent water-spaces in said box, into which water enters through say three openings 94 in the top 43 of each box or basin, Figures 5 and 6. Said openings 94 form continuations of similar openings in the bottom 21 of the engine and valve block, permitting water from the block to enter the several subjacent basins, the bottom or floor of each being designated as 98.

Water wells up through the leg 76, which opens at its lower end at 96 into the basin. Said leg 76 resembles a hollow standing cylinder rising centrally within the annular gas intake passage 75, and joined at its bottom to floor 98 of the basin 41 and to the top 43 of the basin. The water flows up through the leg into the interior of the valve seat and rises to the top of the latter, and escapes into the detachable head 14 through a crescent-shaped opening 97 formed in the top 37 of the valve seat, and a corresponding opening in the bottom 29 of head 14. The side of each basin toward the corresponding cylinder has a cutaway 48 to clear the connecting rod 11.

It will be seen that each valve is cooled and the temperature thereof equalized by the ample water-spaces that surround each valve chest 23, said spaces extending substantially along the entire length of said chest, and that each valve seat is also cooled and the temperature thereof equalized by water that circulates through its entire length. The water enters said interiors from the bottom of the engine block, where the water is coolest. Furthermore, the rotary valve itself is substantially cooled by the charge of incoming fuel, through the annular space 67ª thereof, said charge becoming thereby preheated.

The joint between the top of the engine and valve block 13 and the bottom of the head 14 is sealed by a gasket 100, having perforations that coincide with the cylinder bores, water-passages and bolt holes, and with the rim of each explosion chamber 36. The joints between the top 43 of the basin of each valve seat and the bottom of the engine and valve block, to which the valve seats are attached, are sealed by a gasket 101. There may be a separate gasket 101 for each valve seat, or one gasket may be formed to include the seats of each pair of valves driven by a common pinion 49. In either case, the gaskets are cut to clear the collar 102 of said pinion and leave the semi-circular space 103 (Figures 2, 5 and 9) between adjacent valve seats unobstructed, so that oil from the crank-case may be splashed against pinion 49, and said oil may also work its way upward to lubricate the valve. Suitable helical grooves (not shown) to draw the oil upward may be formed upon either the valve or the seat and chest, or all three. The gaskets 101 have perforations coinciding with the bolt holes 45, water-openings 94, and the opening 82. A large central perforation of each gasket clears the shoulder 40 of the valve seat.

Toward the end of the explosion stroke of the piston, seat ports 62 and 64 are opened by the exhaust ports 63 and 65, which extend through both inner and outer walls 66 and 67 of the rotary valve 47. The walls of ports 63 and 65, where they pass through the valve chamber 67$^a$, are seen at 61. The walls of ports 62 and 64, where they pass through the water-spaces in the valve seat, are seen at 61$^a$.

The timing of the valve ports herein shown corresponds substantially to the timing of a Ford automobile engine, in which ignition occurs in the usual 1—2—4—3 order of the cylinders. The ports 63 and 65 of each valve connect the ports 62 and 64 of each valve seat with elbow-shaped outlets 105 and 106 leading from the corresponding valve chests and formed in the engine block. Said outlets, like the corresponding ports, are arranged in three zones. Figure 11 shows the uppermost zone that includes ports 64, 65, 65$^a$, and outlets 105, said figure being a plan view of a section on the line 11—11 of Figure 2. In said Figure 11 are shown the relative positions of the valve ports with respect to the outlets and passages in the block, when the piston in cylinder 4 is at the end of an explosion stroke. In a similar manner Figure 12 shows a middle zone that includes passages 62, ports 63, 63$^a$, and outlets 106, said Figure 12 being a sectional plan view indicated by the line 12—12 of Figure 2. A plan view of a section through the line 11$^a$—11$^a$ of Figure 2 showing the lowermost zone of passages, ports and outlets would be substantially the same as Figure 11.

In each valve chest bore, at one side thereof, there are two half-sized outlets 105, and on the other side thereof one full-sized outlet 106. Between the valve chests in each pair, the outlet 106 of one chest is placed between two outlets 105 of the other one of said chests, and is divided therefrom by partitions or baffles 107 which minimize back pressure from the exhaust of one valve to any piston, or to any valve. The outlets from one valve chest are divided from the adjacent chest bore by partitions 108, which form parts of the valve chests 23.

The longitudinal row of valve chests, Figure 2, has at its left end a full-sized outlet 106 from the chest of cylinder 4, and has at its right end two half-sized outlets 105 from the chest of cylinder 1. The outer walls 109 of these end outlets consist of expanded parts of the engine block end walls, and are adjacent to water-spaces therebelow in said engine block, being separated therefrom by floors 110. The lower zone outlets 105 between adjacent valve chests are separated from underlying water-spaces by floors 111. The inner ends of all outlets 105 and 106 are separated from outlying water-spaces by their walls 112, Figures 11 and 12.

The three ports, or elbow-outlets between successive valve chests, and the two elbow-outlets 105 at the right end of the row of valve chests all lead outwardly or to the right at Figure 1, between the chests and open into flues, each having for its top the top 20 of the engine block, and the floor of each flue being 111, and its side being the side wall of the valve block, said side wall having discharges 113 from the several flues. Around each discharge opening 113 there is formed a pad 114, the finished surface of which forms a joint with the surface of a corresponding pad 115 of the exhaust manifold 116. The latter has openings 117, coinciding with the openings 113.

The construction of the engine block around the flues, into which the two outlets 105 at the right end of Figure 2 open, is shown in Figure 14, which is an elevational section indicated by the line 14—14 of Figure 11. The outlet 106 at the left end of Figure 2 leads directly into the manifold 116 and has an opening surrounded by a pad 120, the finished surface joining with a corresponding pad 121 of exhaust manifold 116.

The arrangement of each valve with respect to its cylinder in the manner shown has been evolved not only to provide the features already described, but because said arrangement is easily adaptable, at very little extra cost, to means whereby said valve and its seat are also utilized for the auxiliary exhaust from the engine cylinder, which is opened or uncovered by the piston at the bottom portion of the downward stroke. One advantage of the valve control at this point is that the back pressure upon the returning piston during the exhaust stroke is substantially reduced, with a corresponding saving in power and increase in efficiency.

The inner end of the auxiliary exhaust is formed by the port 122 in partition 19 between cylinder 22 and chest 23. Said port has its lower edge flush with the upper chamfered edge of the piston when the latter is at the end of a downward stroke. The port 122 may have any desired height, and the proper time of opening said port may be controlled by port 123 in the rotary valve 47. The circumferential extent of the valve port 123 is such that the engine port 122 remains substantially uncovered by the valve 47 until the piston has risen say $\frac{5}{16}$ of an inch in a Ford automobile engine. The final closing of the port 122 occurs when the upper edge of the piston (having rings 124) has passed beyond the upper edge of the port 122, but the main exhaust 62, 64, keeps open until about the end of the up-stroke of the piston. Both upper and lower edges of the port 122 are beveled as shown in Figure 1, to facilitate the passage of the piston rings over said edges. The valve port 123 connects the engine port 122 to the passage 125 formed by a conduit 126 that conducts the exhaust charge toward an opening 127 in the opposite side of the engine and valve block. Said conduit 126 is integral with the seat and traverses the water-space in the hollow interior of the cylindrical valve seat between the explosion chamber 36 and the water leg 76. Communication between the conduit 126 and the port 127 is effected by means of the port 128 formed in the side of the valve opposite the port 123, at intervals corresponding to the intervals during which the port 123 connects the port 122 with the passage 125. In order that passage between the port 122 and the corresponding opening 127 shall be open only once in each revolution of the valve, the port 128 is located in a zone of the valve substantially below the zone of port 123. The conduit 126 extends obliquely from the zone of the upper port 123 to the zone of the lower port 128, Figure 1. The ports 123 and 128 extend through the hollow wall of the valve and take the form of tubes 129 bridging the annular fuel chamber 67ª within the valve wall.

Figure 13 shows the relative positions of the auxiliary exhaust ports 123 and 128 of each valve with respect to the corresponding engine ports 122 and the discharge outlets 127 when the piston in cylinder 4 is at the end of the explosion stroke. Said Figure 13 is a plan view of a section indicated by the line 13—13 of Figure 1. The sides 130 of each of the valve ports 123 and 128 may be flaring, so as to keep 122 and 127 open as long as 125 is open.

The outer edge of each opening 127 is surrounded by a pad 131, joining a pad 132 on auxiliary exhaust manifold 133, having openings 134 coincident with openings 127. Said auxiliary exhaust manifold may lead either to the atmosphere or to a suitable muffler, not shown, entirely separate from the exhaust muffler of the explosion chamber 36, so as not to retard any piston. Clamps 135 may straddle manifolds 116 and 133, Figures 1 and 7. The hold of said clamps is and may be tightened by nuts 136 threaded upon studs 137 over which holes in said clamps fit, said studs being fastened into the side wall of the engine and valve block. The manifolds 116 and 133 are also held by pins 135ª driven through the ends of the clamps 135, and into but not through the outer walls of the two exhaust manifolds, Figure 1.

The valve 47 may be a one-piece casting that includes both the inner wall 67 and the outer wall 66; but on account of the narrowness of the annular fuel chamber 67ª included by said walls, it is preferable to make said valve 47 in two parts. One part is an outer casting that includes the outer wall 66, the tubular portions 61 and 129 of the exhaust ports, and an inwardly-directed rim 138 that closes the upper end of the annular fuel chamber 67ª. Said outer casting also includes the inner base portion 71, upon which the driving teeth 50 are formed, and the inner circumference of which bears upon the cylindrical valve seat 38. The inner wall 67 may be a separate cylindrical tube, in which are formed the inlet ports 63ª and 65ª, and also the exhaust ports. To support the lower end of the inner wall concentrically with the outer wall, said outer wall is provided with say three bosses 139 (one of which is shown in Figure 3), circumferentially spaced around the inner part of the outer casting. The inner edge of the rim 138, the ends of the partitions 61, 129 and the ends of said bosses 139 are machined to form a bore that fits the outer surface of the separate tube which constitutes the inner wall 67. Proper tightness of the joints between the end of the partitions 61, 129 and said tube, and also the joint between said tube and the rim 138, is preferably secured by a forced fit of the tube in said bore of the outer casting. For the sake of clearness an indication of said joints has been omitted from the different plan views of the valve ports. Said joints may be sealed by butt-welding or brazing if desired. The inner tube or wall 67 may be cast iron, but it is preferably made of steel, and the outer wall is made of cast iron. There is some difference in the coefficients of expansion of the two metals, but the inner steel wall of the valve, when said valve is heated, will not expand to an undue extent relatively to the outer wall. The slightly greater expansion of the inner valve wall tends to tighten the joints between the outer casting and inner tube or wall. It will be understood that compositions of the materials for the inner and outer parts of the valve may be selected so that said materials have the required degree of difference in their coefficients of expansion. The seat is preferably cast iron the same as the block.

Relative rotation between the outer wall and the inner wall is prevented by means of keys 119 dovetailed in slots that cross the rim 138 and the upper edge of the inner wall 67, Figures 1 and 3.

A lower crank-case 68, partly shown, is secured to a corresponding flange 73 of the engine block by means of bolts 84. Said crank-case extends beyond the end of the engine block, as shown in Figure 7, to encase the gears 59 and 60 so that said gears may be lubricated by the oil within said crank-case. A cover 95 encases the upper portion of said gears and is fastened to the extension of said lower crank-case and to a pad 104 formed at the end of the engine block. A gasket 112ª seals the joint between the cover 95 and the pad 104. A gasket 118 seals the joint between the flange 73, the cover 95, and the lower crank-case 68.

The inverted chamber 36 is tapered toward its bottom to increase the water-space in the hollow interior of the valve seat 38, and also to limit the capacity of the explosion chamber of which said chamber 36 forms a part.

The engine may thus be made up of six stationary castings, viz, the water-jacketed and chambered engine and valve block, four valve seats, and the detachable head, all preferably of iron and forming one fixture.

The operation of the engine in regard to any one of the valves is as follows: Fuel from the usual carburettor or intake pipe (not shown) is admitted through the opening 85 into the manifold 81 and through one of its openings 83, and enters opening 82 in the valve seat channel 80. From said channel 80 the fuel rises into annular conduit 75, from which it passes through apertures 74 into the mouth 69 and into the annular chamber 67ª formed by the hollow walls of the rotary valve 47. The fuel is drawn into the inverted explosion chamber 36, inlet ports 63ª and 65ª leading into said explosion chamber 36 being now open. Said inlet ports are then closed at the proper time by the rotation of the valve, and all the ports of explosion chamber 36 remain closed while the piston 10 compresses said charge and during the explosion stroke. Toward the end of said explosion stroke and during the succeeding upward exhaust stroke, the exhaust ports 63 and 65 open the passages 62 and 64 leading from said chamber 36 to the elbow-outlets 105 and 106. Toward the end of the explosion stroke and at a moment coinciding substantially with the opening of the exhaust passages 62 and 64, when the exploded charge has expended its power, the auxiliary exhaust ports 123 and 128 also open communication between the port 122 and the outlet 127, the piston meanwhile having partly uncovered the port 122. Said communication between the port 122 and the auxiliary outlet 127 is fully maintained until the piston in the succeeding upward stroke has covered the port 122 again. Thus, toward the end of said explosion stroke and during the succeeding upward stroke, the burned or exploded charge is expelled from the engine through the exhaust manifolds 116 and 133 to the atmosphere or to the usual mufflers. The drawings illustrate a four-cylinder engine operating in 1, 2, 4, 3 order, the valves with respect to the circumferential disposition of their ports being arranged accordingly.

No claim is made herein to any feature disclosed in my co-pending application No. 55,698, filed September 11, 1925 (now Patent No. 1,691,944, dated November 20, 1928). The claims in this application are limited to features that are not disclosed in said application 55,698.

Variations may be resorted to within the scope of the invention, and ports of the improvements may be used without others.

Having thus described my invention, I claim:

1. In an internal combustion engine, the combination of a one-piece block having therein a row of integral engine cylinders and corresponding integral valve chests standing side by side with the engine cylinders, said block having a water-jacketing including both the engine cylinders and the valve chests, valves revolving in said chests, internal seats for said valves, said seats being internally water-jacketed in communication with the water-jacketing of the block, a gas conduit joining the top of each cylinder to the top of its valve chest and means wholly at the lower ends of the valve seats for detachably securing said seats by their lower ends to said block within said chests.

2. In an internal combustion engine, the combination of a block having therein a row of engine cylinders and corresponding valve chests standing side by side with the engine cylinders, said block having a water-jacketing including both the engine cylinders and the valve chests, valves revolving in said chests, internal seats for said valves, said seats being internally water-jacketed in communication with the water-jacketing of the block, and means detachably securing said seats by their lower ends to said block within said chests, provision being made for circulation of water directly from the bottom of the block up through said valve seats and out of the tops thereof.

3. In an internal combustion engine, the combination with a row of engine cylinders and a row of revoluble valves therefor, of a general exterior water-jacketing for the cylinders and valves, and an interior water-jacketing for the valves in comunication with said general exterior jacketing, each valve having an interior hollow-walled seat forming a water-jacketing which is open at both top and bottom ends of the valve to said general exterior jacketing.

4. In a combustion engine, a valve block including a bottom, a series of valve seats inserted up through said bottom and rotary valves fitted upon said seats, each of said seats being butt-ended at its bottom to form a shoulder, means for fastening the shoulders up against the bottom of the valve block, and chests enclosing said valves and extending up from the bottom of the block, said chests being exteriorly water-jacketed and said seats being interiorly water-jacketed, the bottom of said block having water-spaces in communication with said chests and said seat jackets, the chests being integral with the block, and the bore of each chest extending through both top and bottom thereof.

5. In a combustion engine, a valve block including a bottom, a series of valve seats inserted up through said bottom and rotary valves fitted upon said seats, each of said seats being butt-ended at its bottom to form a shoulder, means for fastening the shoulders up against the bottom of the valve block, and chests enclosing said valves and extending up from the bottom of the block, said chests being exteriorly water-jacketed and said seats being interiorly water-jacketed, the bottom of said block having water-spaces in communication with said chests and said seat jackets, the butt portion of each seat having a basin through which cooling water passes on its way up to the interior water-jacket of the seat.

6. In a combustion engine, a valve block including a bottom, a series of valve seats inserted up through said bottom and rotary valves fitted upon said seats, each of said seats being butt-ended at its bottom to form a shoulder, means for fastening the shoulders up against the bottom of the valve block, and chests enclosing said valves and extending up from the bottom of the block, said chests being exteriorly water-jacketed and said seats being interiorly water-jacketed, the bottom of said block having water-spaces in communication with said chests and said seat jackets, said block having a detachable water-jacketed head to which the upper ends of the interior water-jackets of the seats are open.

7. In a combustion engine, a valve block including a bottom, a series of valve seats inserted up through said bottom and rotary valves fitted upon said seats, each of said seats being butt-ended at its bottom to form a shoulder, means for fastening the shoulders up against the bottom of the valve block, the butt portion of each seat having a fuel passage, and a hollow-walled valve barrel fitted upon each seat and in communication at its lower portion with said fuel passage.

8. In a combustion engine, a valve block including a bottom, a series of valve seats inserted up through said bottom and rotary valves fitted upon said seats, each of said seats being butt-ended at its bottom to form a shoulder, means for fastening the shoulders up against the bottom of the valve block, and chests enclosing said valves and extending up from the bottom of the block, said chests being exteriorly water-jacketed and said seats being interiorly water-jacketed, the bottom of said block having water-spaces in communication with said chests and said seat jackets, the butt portion of each seat having a basin through which cooling water passes on its way up to the interior water-jacket of the seat, said butt portions also including intake passages for fuel, said valves having hollow walls forming fuel-chambers in communication with said fuel intake passages.

9. In a combustion engine, a valve block having a row of valve chest bores extending entirely through the block, barrel valves revolving within said bores, and central seats within said valves, each seat having at its lower end a butt portion in the form of a box having an upper face from which the valve seat rises, said upper face secured up against the bottom of the block, said block having an intake manifold open at its bottom, and each of said butts having an opening into said manifold, the bottom of said manifold being substantially level with the bottom of said valve block, and a single gasket serving for all the seat butts and sealing said butts to the lower edges of the valve chests and to the lower edges of the water courses and to the edges of the intake manifold; openings for both the water and gas being all formed in the top of said butt portions.

10. In a combustion engine, a valve block having a row of valve chest bores extending entirely through the block, barrel valves revolving within said bores, and central seats within said valves, each seat having at its lower end a butt portion in the form of a box having an upper face from which the valve seat rises, said upper face secured up against the bottom of the block.

11. In an internal combustion engine, the combination with a block comprising a row of engine cylinders and a row of valve chests alongside thereof, of valves revolving in said chests, and seats upon which said valves fit, said seats having inverted explosion chambers in communication with the engine cylinders, each seat, valve and chest provided with exhaust ports, said valve being hollow-walled to form a fuel-chamber and ported on its inner wall to supply fuel to the explosion chambers, the inner wall of said valve having at its bottom portion a mouth for the intake of fuel, said seat having a fuel-conduit in its lower portion opening into said mouth, said seat having an internal water-space around said explosion chambers, a water-leg extending from the bottom of said water-space down through or past said fuel-conduit in said seat and a water-basin into which said water-leg opens at its bottom, said water-basin being within a boxing which forms a lower butt end of said seat, said block being water-jacketed, and openings being provided from the water-jacket into said basin.

12. In an internal combustion engine, the combination with a block comprising a row of engine cylinders and a row of valve chests alongside thereof, of valves revolving in said chests, seats upon which said valves fit, said seats having inverted explosion chambers in communication with the engine cylinders, each seat, valve and chest provided with exhaust ports, said valve being hollow-walled to form a fuel-chamber and ported on its inner wall to supply fuel to the explosion chambers, the inner wall of said valve having at its bottom portion a mouth for the intake of fuel, said seat having a fuel-conduit in its lower portion opening into said mouth, said seat having an internal water-space around said explosion chambers, a water-leg extending from the bottom of said water-space down through or past said fuel-conduit in said seat and a water-basin into which said water-leg opens at its bottom, said water-basin being within a boxing which forms a lower butt end of said seat, said block being water-jacketed, and openings being provided from the water-jacket into said basin, said block having an intake manifold, and said fuel-conduits in said seats having individual channel connections to said manifold, and means securing said butt ends up against the bottom of said block.

13. In an internal combustion engine, the combination with a block comprising a row of engine cylinders and a row of valve chests alongside thereof, of valves revolving in said chests, seats upon which said valves fit, said seats having inverted explosion chambers in communication with the engine cylinders, each seat, valve and chest provided with exhaust ports, said valve being hollow-walled to form a fuel-chamber and ported on its inner wall to supply fuel to the explosion chambers, the inner wall of said valve having at its bottom portion a mouth for the intake of fuel, said seat having a fuel-conduit in its lower portion opening into said mouth, said seat having an internal water-space around said explosion chambers, a water-leg extending from the bottom of said water-space down through or past said fuel-conduit in said seat and a water-basin into which said water-leg opens at its bottom, said water-basin being within a boxing which forms a lower butt end of said seat, said block being water-jacketed and openings being provided from the water-jacket into said basin, said block having an intake manifold, and said fuel-conduits in said seats having individual channel connections to said manifold, and means securing said butt ends up against the bottom of said block, said intake manifold being formed upon the water-jacketing of said block and separated from the water by a wall.

14. In an internal combustion engine, the combination with a block comprising a row of engine cylinders and a row of valve chests alongside thereof, of valves revolving in said chests, seats upon which said valves fit, said seats having inverted explosion chambers in communication with the engine cylinders, each seat, valve and chest provided with exhaust ports, said valve being hollow-walled to form a fuel-chamber and ported on its inner wall to supply fuel to the explosion chambers, the inner wall of said valve having at its bottom portion a mouth for the intake of fuel, said seat having a fuel-conduit in its lower portion opening into said mouth, said seat having an internal water-space around said explosion chambers, a water-leg extending from the bottom of said water-space down through or past said fuel-conduit in said seat and a water-basin into which said water-leg opens at its bottom, said water-basin being within a boxing which forms a lower butt end of said seat, said block being water-jacketed, and openings being provided from the water-jacket into said basin, and a head for said block having a water-jacket communicating with the water-spaces in said seats, each explosion chamber connected over the top edge of its associated valve with its associated engine cylinder.

15. In an internal combustion engine, the combination with a block comprising a row of engine cylinders and a row of valve chests alongside thereof, of valves revolving in said chests, seats upon which said valves fit, said valves having inverted explosion chambers in communication with the engine cylinders, each seat, valve and chest provided with exhaust ports, said valve being hollow-walled to form a fuel-chamber and ported on its inner wall to supply fuel to the explosion chambers, the inner wall of said valve having at its bottom portion a mouth for the intake of fuel, said seat having a fuel-conduit in its lower portion opening into said mouth, said seat having an internal water-space around said explosion chambers, a water-leg extending from the bottom of said water-space down through or past said fuel-conduit in said seat and a water-basin into which said water-leg opens at its bottom, said water-basin being within a boxing which forms a lower butt end of said seat, said block being water-jacketed, and openings being provided from the water-jacket into said basin, and a head for said block having a water-jacket communicating with the water-spaces in said seats, each explosion chamber connected over the top edge of its associated valve with its associated engine cylinder by means of a connection in the form of a gooseneck passage formed in said head.

16. In an internal combustion engine, the combination with a block comprising a row of engine cylinders and a row of valve chests alongside thereof, of valves revolving in said chests, seats upon which said valve fit, said seats having each an inverted explosion chamber in its top and having a water-jacket around said explosion chamber, said water-jacket extending to the bottom of the seat, a water-leg extending from said seat down into a water-basin in a boxing forming a lower butt end of said seat, and means securing said butt end up against the bottom of the water-jacketed block, said basin communicating with the water-jacket of the block through holes in the basin and in the bottom of the engine block.

17. In an internal combustion engine, the combination with a block comprising a row of engine cylinders and a row of valve chests alongside thereof, of valves revolving in said chests, seats upon which said valves fit, said seats having each an inverted explosion chamber in its top and having a water-jacket around said explosion chamber, said water-jacket extending to the bottom of the seat, a water-leg extending from said seat down into a water-basin in a boxing forming a lower butt end of said seat, and means securing said butt end up against the bottom of the water-jacketed block, said basin communicating with the water-jacket of the block through holes in the basin and in the bottom of the engine block, said valve being hollow-walled and having a mouth on its inner side at its lower portion, said seat having an intake conduit opening into said mouth and a U-shaped gas-channel in said butt end and opening at its inner-end into said conduit, the latter surrounding said water-leg, said channel opening at its outer end into an intake manifold, and said seat, explosion chamber, water-leg and butt end being integral.

18. In an internal combustion engine, the combination with an engine cylinder and a piston, of means including a rotary valve placed by the side of said cylinder for controlling intake and exhaust from said cylinder, a ported chest for said valve, the cylinder having a vent which is normally covered by the piston but which is uncovered thereby at the concluding portion of the explosion stroke of the piston, said valve having a port which opens to receive the exhaust escaping through said vent, and means for conducting away the exhaust.

19. In an internal combustion engine, the combination with an engine cylinder and a piston, of means including a rotary valve placed by the side of said cylinder for controlling intake and exhaust from said cylinder, a ported chest for said valve, the cylinder having a vent which is normally covered by the piston but which is uncovered thereby at the concluding portion of the explosion stroke of the piston, said valve having a port which opens to receive the exhaust escaping through said vent, said valve in the form of a barrel, a ported seat around which said valve revolves to co-operate therewith to control both intake and exhaust of the engine, said seat also having an auxiliary exhaust conduit opened by said valve to receive the gas passing through the vent uncovered by said piston, and means for conducting the vented gas away from said conduit.

20. In an internal combustion engine, the combination with an engine cylinder and a piston, of means including a rotary valve placed by the side of said cylinder for controlling intake and exhaust from said cylinder, a ported chest for said valve, the cylinder having a vent which is normally covered by the piston but which is uncovered thereby at the concluding portion of the explosion stroke of the piston, said valve having a port which opens to receive the exhaust escaping through said vent, said valve in the form of a barrel, a ported seat around which said valve revolves to co-operate therewith to control both intake and exhaust of the engine, said seat also having an auxiliary exhaust conduit opened by said valve to receive the gas passing through the vent uncovered by said piston, and means for conducting the vented gas away from said conduit, said conducting means including an auxiliary port in the opposite side of said valve, said chest ported to register with said opposite auxiliary valve port.

21. In an internal combustion engine, the combination with an engine cylinder and a piston, of means including a rotary valve placed by the side of said cylinder for controlling intake and exhaust from said cylinder, a ported chest for said valve, the cylinder having a vent which is normally covered by the piston but which is uncovered thereby at the concluding portion of the explosion stroke of the piston, said valve having a port which opens to receive the exhaust escaping through said vent, said valve in the form of a barrel, a ported seat around which said valve revolves to co-operate therewith to control both intake and exhaust of the engine, said seat also having an auxiliary exhaust conduit opened by said valve to receive the gas passing through the vent uncovered by said piston, and means for conducting the vented gas away from said conduit, said conducting means including an auxiliary port in the opposite side of said valve, said chest ported to register with said opposite auxiliary valve port, the auxiliary ports in said valve being in different zones or elevations, so that said valve opens the vent in said cylinder only once for each complete cycle of four piston strokes; said opposite auxiliary valve port being always out of register with said cylinder vent.

22. In an internal combustion engine, the combination with an engine cylinder and a piston, of means including a rotary valve placed by the side of said cylinder for controlling intake and exhaust from said cylinder, a ported chest for said valve, the cylinder having a vent which is normally covered by the piston but which is uncovered thereby at the concluding portion of the explosion stroke of the piston, said valve having a port which opens to receive the exhaust escaping through said vent, said valve in the form of a barrel, a ported seat around which said valve revolves to co-operate therewith to control both intake and exhaust of the engine, said seat also having an auxiliary exhaust conduit opened by said valve to receive the gas passing through the vent uncovered by said piston, and means for conducting the vented gas away from said conduit, said conducting means including an auxiliary port in the opposite side of said valve, said chest ported to register with said opposite auxiliary valve port, the auxiliary ports in said valve being in different zones or elevations, so that said valve opens the vent in said cylinder only once for each complete cycle of four piston strokes; said opposite auxiliary valve port being always out of register with said cylinder vent; said seat including a water-jacket which cools said transverse auxiliary exhaust conduit.

23. In an internal combustion engine, the combination with an engine cylinder and a piston, of means including a rotary barrel valve placed by the side of said cylinder for controlling intake and exhaust from said cylinder, a ported chest and a ported seat for said valve, said engine cylinder having an auxiliary vent opened by the piston at the final portion of its explosion stroke, said valve having on one side an auxiliary port opening into said vent and having on its opposite side a corresponding auxiliary port at a different level, and a transverse conduit extending across said seat and forming an exhaust passage between said auxiliary ports in said valve, said chest having an auxiliary exhaust port co-operating with said valve.

24. The combination of a block having a row of engine cylinders, a row of valve chests ranged alongside of said cylinders, valves rotating in said chests, said valves having main exhaust ports, said engine cylinders having auxiliary exhaust ports uncovered by the pistons near the conclusions of the explosion strokes, said valves having auxiliary ports coordinated with said pistons and said auxiliary exhaust ports, means conducting the exhaust gases from one side of each valve across to the other side thereof at a point below said main valve ports, and means leading the exhaust from each valve out of the engine block.

25. In an internal combustion engine, the combination with a block comprising a row of engine cylinders, and a row of valve chests alongside thereof, of valves revolving in said chests, and seats upon which said valves fit, said seats having inverted explosion chambers in communication with the engine cylinders, each seat, valve and chest provided with exhaust ports, said valve being hollow-walled to form a fuel-chamber and ported on its inner wall to supply fuel to the explosion chamber, each seat having a water-space around its explosion chamber, said engine cylinder having an auxiliary vent opened by the piston at the final portion of its explosion stroke, said valve having on one side an auxiliary port opening into said vent and having on its opposite side a corresponding auxiliary port at a different level, and a transverse conduit extending across said seat and forming an exhaust passage between said auxiliary ports in said valve, said chest having an auxiliary exhaust port co-operating with said valve, said transverse exhaust passage being formed in said seat below said explosion chamber, said valve being hollow-walled and ported on its inner side to supply fuel to said explosion chamber, said valve chamber having at its lower end upon its inner side a mouth, and said seat having a gas conduit communicating with said mouth, said seat also having a water-leg extending down from said water-space within said gas-passage, said seat having a lower butt end and means for securing it up against the bottom of said engine block, said butt end having a water-basin in communcation with the water-jacket in said block, and said seat also having in its lower end a channel connecting its said gas conduit to an intake manifold, an exhaust manifold being provided upon said block above said intake manifold and communicating through said valve with said transverse passage in said seat.

26. In an internal combustion engine, the combination with an engine cylinder, of a rotary valve, a ported seat for said rotary valve, and a ported chest in which said valve rotates, said valve having exhaust ports extending therethrough and having inner and outer spaced walls forming a fuel-chamber, the inner wall only having ports co-operating with the ports in said seat, said inner wall formed at its lower portion with a mouth, and said seat having an intake gas-conduit opening into said mouth.

27. The combination of a row of engine cylinders, a row of chests, valves in the chests, seats in the valves, a block containing said chests, valves and seats, said seats detachably secured to said block, an intake manifold extending along said chests, and passages from said manifold to said seats to supply fuel to said valves, each chest open at its top and bottom for insertion of the seats therein, the seats having lower butt ends subjacent the block, and means for forcing said butt ends up against the bottom of the block.

28. The combination of a row of engine cylinders, a row of chests, valves in the chests, seats in the valves, a block containing said chests, valves and seats, said seats detachably secured to said block, an intake manifold extending along said chests, and passages from said manifold to said seats to supply fuel to said valves, each chest open at its top and bottom for insertion of the seats therein, the seats having lower butt ends subjacent the block, and means for forcing said butt ends up against the bottom of the block, each butt end having a gas-channel at one end open at the top into its seat and at the other end open at the top into said manifold.

29. The combination of a row of engine cylinders, a row of chests, valves in the chests, seats in the valves, a block containing said chests, valves and seats, said seats detachably secured to said block, an intake manifold extending along said chests, and passages from said manifold to said seats to supply fuel to said valves, each chest open at its top and bottom for insertion of the seats therein, the seats having lower butt ends subjacent the block, and means for forcing said butt ends up against the bottom of the block, each butt end having a gas-channel at one end open at the top into its seat and at the other end open at the top into said manifold, each seat having its lower portion a circular fuel-chamber having an opening into the mouth in said valve, and a fuel-channel running down from the bottom of said fuel-conduit and then outwardly under the valve and then up to said manifold.

30. A hollow rotary valve barrel for an internal combustion engine, including a cylindrical barrel casting and a cylindrical tube fitting tightly therein and flush with the inner wall thereof and spaced therefrom, said barrel having below said tube a mouth for the intake of fuel and having at its bottom exterior drive teeth formed therein, said valve having transverse opposite auxiliary exhaust ports in different zones, said valve having main exhaust ports above said auxiliary ports, all of said ports extending through both the casting and the tube, and the casting having internal tubular bosses bridging the annular fuel-chamber within the valve at said exhaust ports, said tube having inlet ports in the same zone with the main exhaust ports, said casting having an inturned top brim fitting into said tube.

31. In an internal combustion engine, the combination with an engine cylinder, of a rotary valve, a ported seat for said rotary valve, and a ported chest in which said valve rotates, said valve having exhaust ports extending therethrough and having inner and outer spaced walls forming a fuel-chamber, the inner wall only having ports co-operating with the ports in said seat, said valve having a supply opening on the same inner cylindrical surface as said ports.

32. The combination with an engine and valve block having engine cylinders and valve chests, of ported barrel valves revolving in said chests, ported seats within said valves and having explosion chambers, said chests being alongside of and parallel with said cylinders and ported to correspond with the seat ports, each chest ported on its opposite sides, and the porting in each chest facing the porting in the next chest, said block having elbow outlets into which said chest portings open, said elbow outlets extending to the side of said block away from the engine cylinders, the porting of each chest including a large exhaust port in one wall thereof and half-size exhaust ports in the opposite wall thereof and in different zones from the large port, all of said chest ports having said elbow outlets, the large outlet in each valve chest being placed between the small outlets of the adjacent valve chests and being divided therefrom by baffles, flues into which said elbow outlets open between said chests, and an exhaust manifold communicating with said flues, each flue receiving the discharge from adjacent chests.

33. In an internal combustion engine, the combination with an engine cylinder, of a rotary valve, a ported seat for said rotary valve, a ported chest having a bore in which said valve rotates, said valve having exhaust ports extending therethrough and having inner and outer spaced walls forming a fuel-chamber, the inner wall only having ports co-operating with the ports in said seat, and a locating ring fitting in the upper end of said seat and fitting within the top of said chest bore.

34. In an internal combustion engine, the combination with an engine cylinder, of a rotary valve, a ported seat for said rotary valve, a ported chest having a bore in which said valve rotates, said valve having exhaust ports extending therethrough and having inner and outer spaced walls forming a fuel-chamber, the inner wall only having ports co-operating with the ports in said seat, and a locating ring fitting in the upper end of said seat and fitting within the top of said chest bore, said seat having at its lower end a circular shoulder fitting in said chest bore.

BURNHAM C. STICKNEY.